United States Patent
Zhou et al.

(10) Patent No.: US 9,149,845 B2
(45) Date of Patent: Oct. 6, 2015

(54) MICROBIAL FUEL CELL FOR IN-SITU TREATMENT OF SEDIMENT SIMULTANEOUS WITH ELECTRICITY GENERATION AND METHOD OF USING THE SAME

(75) Inventors: Shungui Zhou, Guangdong (CN); Lixia Zhang, Guangdong (CN); Li Zhuang, Guangdong (CN); Yueqiang Wang, Guangdong (CN)

(73) Assignee: Guangdong Institute of Ecoenvironmental and Soil Sciences (CN)

( * ) Notice: Subject to any disclaimer, the term of this patent is extended or adjusted under 35 U.S.C. 154(b) by 454 days.

(21) Appl. No.: 13/510,173

(22) PCT Filed: Jul. 16, 2010

(86) PCT No.: PCT/CN2010/075216
§ 371 (c)(1),
(2), (4) Date: Jul. 19, 2012

(87) PCT Pub. No.: WO2011/006448
PCT Pub. Date: Jan. 20, 2011

(65) Prior Publication Data
US 2012/0276418 A1    Nov. 1, 2012

(30) Foreign Application Priority Data
Jul. 17, 2009   (CN) .......................... 2009 1 0041236

(51) Int. Cl.
*H01M 8/04*    (2006.01)
*H01M 8/16*    (2006.01)
(Continued)

(52) U.S. Cl.
CPC . *B09C 1/10* (2013.01); *C02F 3/005* (2013.01); *H01M 8/16* (2013.01); *C02F 11/006* (2013.01); *C02F 2103/007* (2013.01); *Y02E 60/527* (2013.01)

(58) Field of Classification Search
CPC ..... B09C 1/10; C02F 3/005; C02F 2103/007; C02F 11/006; H01M 8/16
USPC ....................................... 429/2, 401
See application file for complete search history.

(56) References Cited

U.S. PATENT DOCUMENTS

2003/0138674 A1   7/2003  Zeikus et al.
2006/0147763 A1*  7/2006  Angenent et al. ................. 429/2
(Continued)

FOREIGN PATENT DOCUMENTS

CN     1364146 A     8/2002
CN     1806736 A     7/2006
(Continued)

OTHER PUBLICATIONS

International Search Report for PCT/NC2010/075216 dated Oct. 28, 2010.
(Continued)

*Primary Examiner* — Sean P Cullen
(74) *Attorney, Agent, or Firm* — Lerner, David, Littenberg, Krumholz & Mentlik, LLP (57) ABSTRACT

A method for in-situ treatment of sediment simultaneous with microbial electricity generation is provided, comprising steps of constructing a microbial fuel cell, placing the microbial fuel cell in the sediment, forming a cell circuit, and cultivating microorganisms to generate electrical power. The method overcomes shortcomings found in the prior art and uses organics in the sediment as fuels to in-situ treat the sediment with simultaneous electricity generation. A device for implementing the method is also provided, which can be expanded in different directions as needed and is easy to maintain during long-term operation. The device has many advantages including compact structure, easy operation, low cost, high output power density, significant reduction in sediment COD, no influence on water flow, and environment-friendly.

18 Claims, 4 Drawing Sheets

(51) Int. Cl.
  *B09C 1/10* (2006.01)
  *C02F 3/00* (2006.01)
  *C02F 11/00* (2006.01)
  *C02F 103/00* (2006.01)

(56) References Cited

U.S. PATENT DOCUMENTS

2007/0048577 A1 3/2007 Ringeisen et al.
2008/0292912 A1* 11/2008 Logan et al. ................ 429/2

FOREIGN PATENT DOCUMENTS

| CN | 1874040 A | 12/2006 |
| CN | 101200315 A | 6/2008 |
| CN | 101315985 A | 12/2008 |
| CN | 101609895 A | 12/2009 |
| CN | 101615685 A | 12/2009 |
| WO | WO 2008110176 A1 * | 9/2008 |

OTHER PUBLICATIONS

Written Opinion of the International Searching Authority for PCT/CN2010/075216 dated Oct. 28, 2010.

* cited by examiner

MICROBIAL FUEL CELL FOR IN-SITU TREATMENT OF SEDIMENT SIMULTANEOUS WITH ELECTRICITY GENERATION AND METHOD OF USING THE SAME

CROSS-REFERENCE TO RELATED APPLICATION

The present application is a national phase entry under 35 U.S.C. §371 of International Application No. PCT/CN2010/075216 filed Jul. 16, 2010, published on Jan. 20, 2011 as WO/2011/006448 A1, which claims priority from China Patent Application No. CN 200910041236.9 filed in the China Patent Office on Jul. 17, 2009.

TECHNICAL FIELD

The present invention is involved in environment and new energy technology and relates to treatment and management of sediment by utilizing microbial fuel cell, and in particular, to methods and devices for microbial electricity generation and in-situ reduction of chemical oxygen demand (COD) of sediments by utilizing the polluted sediments of water bodies such as rivers, pool ponds and canals.

TECHNICAL BACKGROUND

Black and odorous water and water eutrophication are common characteristics of water pollution. Long-time waste receiving has caused sediment deposition in water bodies such as rivers, pool ponds and canals. When the water quality is significantly improved or the water is disturbed, contamination constitutes in the sediment would release to the water, causing the sediment to be an inherent contamination source of the water body. Therefore, sediment management is fundamental to water quality improvement and key to solve water pollution problems. Exploration and development of sediment management techniques is imperative.

Currently, the main methods for sediment management include sediment dredging, chemical shielding and microbial remediation.

Sediment dredging mechanically removes contaminated sediment, clearing the inherent contamination source of a water body, which is the most commonly used method. However, this method is costly and includes steps of excavating, transporting, treating, disposing, and so on. Moreover, the disposal of the sediment may cause secondary pollutions such as unpleasant odor and leachate pollution.

Chemical shielding (or referred to as sediment capping) provides tremendous shielding materials upon the contaminated sediment to separate the sediment from the water body, so as to prevent nutrient contents, heavy metal elements and organic wastes in the sediment from entering into the water body. For example, CN 200710191195.2 disclosed a method for capping eutrophicated sediment in which a large amount of clay shielding materials and additives were used. These materials were subject to pretreatment including grinding, sieving, and high-temperature baking. When fed to the water body, these materials can only prevent the release of nutrient salts such as nitrogen and phosphate and algal blooms, failing to fundamentally resolve pollution problems. Contaminated sediment would still be formed over time due to the deposition and accumulation of the contaminants in the water body.

Microbial remediation in-situ degrades the contaminants in the sediment into $CO_2$ and water or converts the sediment to non-harmful substance by utilizing naturally occurring or cultivated microorganisms. This method is not a simple separation or transfer, but in-situ elimination, of contaminants, and has advantages including low cost, easy implementation, good effect, less environmental disturbance, high safety and reliability.

Sediment of water body has a high content (2 to 45%) of organics which is the main reason of sediment anaerobic digestion and poor water quality. These three methods currently used are directed to the transfer or in-situ elimination of the contaminants in the sediment with the aim to reduce the COD therein, without considering transformation, collection and utilization of the biomass energy enriched in the sediment, resulting in waste of the energy.

In recent years, microbial fuel cell (MFC), as a new technology resulted from combination of microbiology and cell technology, is fast developing. MFC is a device that directly converts chemical energy in organics into electric energy using microorganism as catalyst, and has a dual function of power generation and waste treatment. The basic principle of MFC is summarized as follows. Organics, serving as fuels, are oxidized by microorganisms to release electrons and protons in anaerobic anode chamber. The electrons are transferred to the anode and further to the cathode through external circuits, thus a closed loop is formed and current is generated. The protons are transferred to the cathode through an ion exchange membrane, and react with oxygen to generate water.

In addition to high concentration of organic waste water, MFC can also use domestic sewage, animal manures and etc. as fuels to generate electricity. Therefore, MFC is an advanced biomass energy utilizing technique with huge development potential and is expected to become a key technique in organic waste treatment in the future. CN 200510011855.5 and CN 00810805.6 disclosed a single-chamber microbial fuel cell for treating organic waste and a dual-chamber microbial fuel cell for treating waste water and active sludge, respectively. These cells, however, are laboratory scale cells with open circuit voltage not more than 0.8 V. These documents didn't mention the expansion and enlargement of multiple cells. CN 200810029221.6, filed in the name of the assignee of the present invention, disclosed a microbial fuel cell stack which is a multi-stage series/parallel MFC cell stack sharing a common anode fuel. The provided cell stack unified the out/in of fuels, provided an increase in voltage/current, and achieved the expansion and enlargement of microbial fuel cells. However, the cell stack is still only suitable for using aqueous or slurry type organic wastes with low solid content and good flowability as fuels. The fuels are pumped to the anode chamber of the cell stack and subject to biological oxidation for power generation and elimination of COD, and then flowed out, for the purpose of both treatment and power generation.

The microbial fuel cells mentioned above, however, are not suitable for sediment treatment, because of the following reasons. First, the sediment should be pumped to the anode chamber of the MFC, which constitutes extremely large work load. Moreover, this is difficult to realize in the presence of superjacent waters, and the sediment cannot be treated in-situ. Second the sediment has a high solid content, the particulates in which are easy to cause blockage. Third, in order to achieve in-situ treatment, MFC must be immersed into the sediment such that the sediment is in contact with the anode. The cathode of conventional MFC would not expose to air if the cell is immersed in water body, the oxidation-reduction reaction thus would not happen at the cathode. These existing technical problems make the conventional MFCs not able to be directly used for sediment treatment and clean electricity generation.

No report regarding sediment treatment using microbial fuel cell technology with simultaneous electricity generation is found in the prior art.

SUMMARY OF THE INVENTION

An object of the present invention is to provide a new method for in-situ treatment of sediment contamination simultaneous with electricity generation by using microbial fuel cell. The present method can in-situ oxidize the organics in the sediment to $CO_2$ and water, and meanwhile, providing clean electricity. The method thus has a dual function of in-situ treatment of sediment and microbial electricity generation.

Another object of the present invention is to provide a microbial fuel cell device for in-situ treatment of sediment contamination simultaneous with electricity generation. The device can be conveniently placed in water bodies such as rivers, pool ponds and canals, and uses the organics in the sediment as fuels. The resultant electrical power can be used for oxygen aeration.

These objects are achieved by providing a method for in-situ treatment of sediment simultaneous with microbial electricity generation power, comprising placing a microbial fuel cell in sediment of a water body, the microbial fuel cell using organics in the sediment as fuel and comprising a cathode chamber, a cathode, an anode and conductors extending from the cathode and the anode, the cathode chamber being filled with air, and the cathode being oxygen aerated by the air in the cathode chamber, and the anode being in close contact with the cathode at one side and with the sediment at the other side.

Specifically, the method comprises steps of: (i) providing an insulated cell frame with a perforated section, wherein an inner space of the cell frame is served as the cathode chamber with air filled therein, the perforated section being wrapped by the cathode which is exposed to the air in the cathode chamber through perforations on the perforated section, an outer surface of the cathode being wrapped by the one side of the anode, the electric wires being extended from the cathode and the anode respectively, so that the microbial fuel cell is constructed; and (ii) placing the microbial fuel cell in the sediment such that the cathode chamber is filled with air, wherein the other side of the anode is in contact with the sediment, then connecting the electric wires to form a cell circuit, and cultivating microorganisms to generate electricity.

Preferably, to ensure the cathode chamber be filled with air, the cell frame is open at one end with communication with air, and closed at the other end. The perforated section is wrapped by the cathode and treated to be waterproof. The closed end of the cell frame is inserted into the sediment with the open end above the water. The anode is arranged to be in contact with the sediment. A cell is thus constructed. In use, the microbial fuel cell is inserted into sediment of a water body such as a river, a pool pond or a canal. The perforated section, wrapped with the cathode and the anode, is immersed into the sediment. The top end of the insulated frame is above the water body to make sure the cathode chamber is filled with air. When a cell circuit is formed, microorganisms will be cultivated to generate electricity.

The present method may further comprise a step of constructing the microbial fuel cell in the step (1) as a microbial fuel cell stack, and then step (2) is carried out.

The effect of the present invention can be assessed by determining the COD reduction of the sediment and the output power density.

The insulated cell frame of the microbial fuel cell can be a PVC tube with a perforated section. The cathode may be a membrane cathode. The tube may have one or two or more perforated sections with each of the perforated sections being firstly wrapped by the membrane cathode, then treated to ensure waterproof at the connection areas between the cathode and the tube, and lastly covered by the anode on the outer surface of the cathode.

As a more preferable option, two or more insulated tubes are connected together by a connection tube to form a closed circuit, so as to construct a cell stack. Specifically, the cell stack comprises a plurality of microbial fuel cells and a plurality of connection tubes. The insulated tube of each of the microbial fuel cells has two open ends, with one of the two open ends connected to one another by the connection tubes. The connection tubes are interconnected with each other to form a closed loop with air filled therein. Alternatively, the connection tubes are not interconnected, and are only served to close one of the open ends of the insulated tube and ensure the other open end be above the water.

According to the above, there may be a variety of cell stacks. For example, two or more microbial fuel cells have PVC tube as the cell frame with two ends open. The PVC tubes are vertically (or perpendicularly) disposed on a same connection tube that has two closed ends, to form a cell stack. This cell stack is suitable for use in a long narrow water body. The connection tube may also be made from insulated materials, such as PVC material. The connection tube can also be replaced by a mounting plate, two or more microbial fuel cells being in sealed connection therewith to form a cell stack.

The plurality of the microbial fuel cells can be vertically disposed on a plurality of cross-connected connection tubes. The connection tubes are interconnected to form a closed loop with air filled therein. Each of the microbial fuel cells is vertically placed in the sediment to be treated with the top end of the cell above the water to ensure the cathode chamber is filled with air. The air is able to communicate between each of the cathode chambers of the cells, so as to form a cell stack.

The top end of the cell frame of each microbial fuel cell is above the water body to ensure the air is filled within the cathode chamber. The number of the cell frame tube and the connection tube can be increased as needed. The MFCs can be connected in series or in parallel to obtain better effects.

The cell frame tube and the connection tube can be made from low-cost insulated materials, preferably PVC tubes. The perforation can be achieved using conventional methods known in the art, including slotting, drilling and others. There is no particular requirement on the shape or size of the holes or slots perforated. In the present invention, it is preferable to use drilling to form holes. A PVC tube having a diameter of 5 to 20 cm can be used. A section of the tube having a length of 10 to 30 cm can be used as a pre-perforated section. Holes with diameter of 0.5 to 2 cm can be formed by drilling on the pre-perforated section at a density of 100 to 3000 holes per square meters to form the perforated section.

The membrane cathode may be formed by hot press of carbon cloth carrying catalysts and membrane. To reduce the cost, low-cost membranes can be used, such as anion exchange membrane or cation exchange membrane. Cloth cathodes, as described in CN 200910040920.5 owned by the assignee of the present application, can also be used. The catalysts are selected according to conventional practice, for example, pyr-FePc, CoTMPP or $MnO_2$, etc.

An exemplary preparation method for the membrane cathode is provided. Catalysts (pyr-FePc, CoTMPP or $MnO_2$), conducting materials, and adhesives (polytetrafluoroethylene (PTFE) or polyvinylidene fluoride (PVDF)) are well mixed in a weight ratio of 65:20:15. N-methyl-pyrrolidone solvent is added and stirred to form paste. The paste is then subject to ultrasonic dispersion and evenly applied to a dry carbon cloth. The applied carbon cloth is vacuum dried to obtain the cathode. The cathode is then hot pressed with a diaphragm at 115 to 120° C. for 3 to 10 minutes to obtain the membrane cathode.

Materials suitable for making the anode are mainly carbon materials having relatively large surface area, such as carbon felt or carbon fiber.

The perforated section is wrapped by the membrane cathode with the carbon cloth side of the membrane cathode facing towards the PVC cell frame tube. The membrane cathode is exposed to the air in the cell frame tube through the perforations in the perforated section. The side of the membrane cathode opposite to the carbon cloth side is wrapped by and in close contact with the anode material. Conductors are extended from the anode and the cathode respectively. A microbial fuel cell stack is thus formed.

The present invention overcomes shortcomings found in the prior art including, for example, the high cost, onerous steps, easy to cause secondary pollution with respect to the sediment dredging method, the complicated pretreatment steps and non-fundamental contamination clearance with respect to the chemical shielding method, and no transformation, collection and usage of the biomass energy enriched in the sediment with respect to the microbial remediation method. The present invention takes advantage of microbial fuel cell to in-situ treat sediments and use organics in the sediments as fuels to generate electricity which can be used for oxygen aeration.

The present invention also provides a device for implementing the method. There is no need for pumping the sediment to the anode chamber of microbial fuel cell, and the cathode is able to be exposed to air. It well addresses the technical challenges encountered when microbial fuel cells are applied in treatment of sediments. The present invention enables effective treatment of sediments with high solid content and efficient re-use of energy. The device can be expanded in different directions as needed and is easy to maintain during long-term operation. The device has many advantages including compact structure, easy operation, low cost, high output power density, significant reduction in sediment COD, no influence on water flow, environment-friendly, and etc, and is thus suitable for large-scaled application.

DETAILED DESCRIPTION OF EMBODIMENTS

The present invention will now be described in more detail in the following examples in reference to the accompanied drawings.

Example 1

A method for in-situ treatment of sediment simultaneous with microbial electricity generation by using a tubular microbial fuel cell is provided in this example. The method comprises steps of:

(1) providing an insulated cell frame with a perforated section, an inner space of the cell frame being served as the cathode chamber with air filled therein, the perforated section being wrapped by the cathode which is exposed to the air in the cathode chamber through perforations on the perforated sections, an outer surface of the cathode being wrapped by the one side of the anode, to form the microbial fuel cell; and (2) placing the microbial fuel cell in the sediment with the cathode chamber filled with air, then connecting the conductors to form a cell circuit, so that microorganisms are cultivated to generate electricity.

Figure 1:
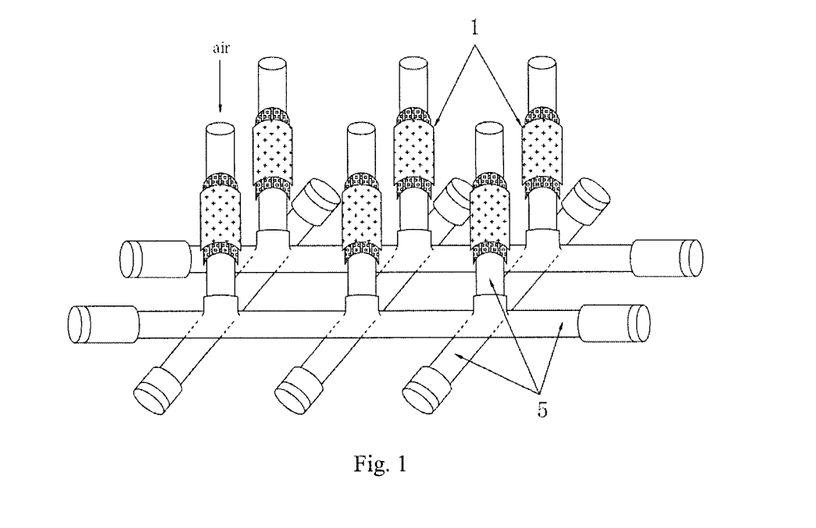
FIG. 1 is a schematic view of a microbial fuel cell stack according to one embodiment of the present invention.
Figure 2:
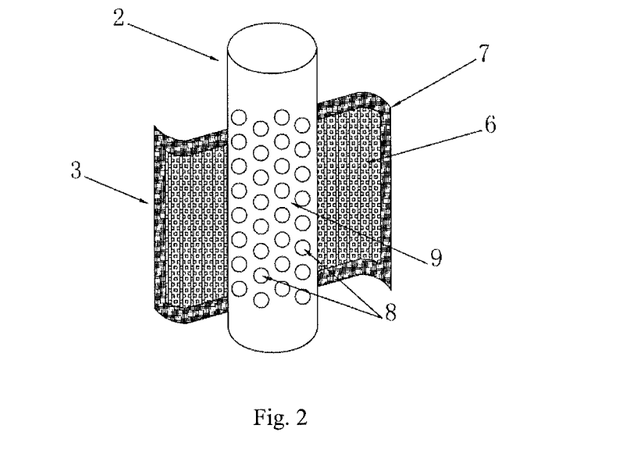
FIG. 2 is a schematic view showing a perforated cell frame is wrapped by a membrane cathode of a microbial fuel cell.
Figure 3:
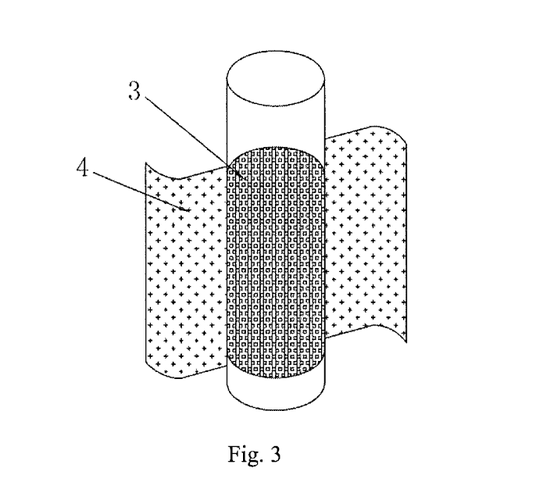
FIG. 3 is a structural view showing a cathode is wrapped by an anode of a microbial fuel cell.
Figure 4:
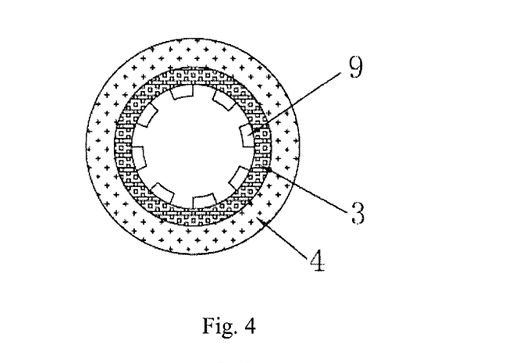
FIG. 4 is a structural view showing a sectional view of a monomer microbial fuel cell.
Figure 5:
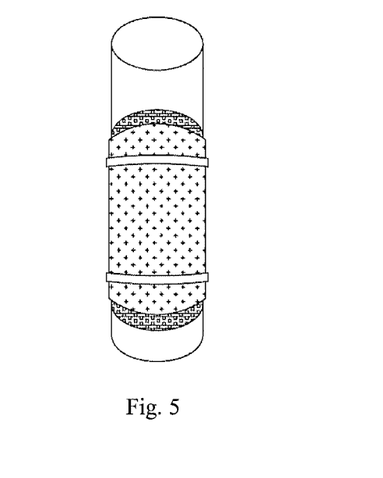
FIG. 5 is an exemplary monomer microbial fuel cell.

Specifically, with reference to FIGS. 2 to 5, wherein the FIG. 2 is a schematic view showing a perforated cell frame is wrapped by a membrane cathode of a microbial fuel cell, FIG. 3 is a structural view showing a cathode is wrapped by an anode of a microbial fuel cell, FIG. 4 is a structural view showing a sectional view of a monomer microbial fuel cell, and FIG. 5 is an exemplary monomer microbial fuel cell with the closed end omitted. In the figures, numeral 1 indicates a cell, and the arrow of the numeral shows the wrapping of an anode over a cathode; numeral 2 indicates a frame; numeral 9 indicates a perforated section; numeral 8 indicates holes of the perforated section; numeral 3 indicates the membrane cathode comprising a carbon cloth 6 carrying catalysts and a membrane; numeral 4 indicates the anode; and numeral 5 indicates a connection tube.

The cell comprises a frame 2 having a perforated section 9, a membrane cathode 3, and an anode 4. The perforated section 9 of the frame 2 is wrapped by the membrane cathode 3 to form a cathode chamber (see FIG. 2). The membrane cathode 3 is wrapped by the anode 4 (see FIG. 3). Wires (known knowledge, omitted and not shown in the figures) are extended from the membrane cathode 3 and anode 4 respectively.

The perforated section 9, the membrane cathode 3 and the anode 4 can be imaginarily treated as a whole structure, a plurality of which can be applied to different positions of a single tubular cell frame.

The frame is made from insulated tubal materials, preferably PVC tubes. The perforated section can be formed by conventional methods, preferably by drilling A PVC tube having a diameter of 5 to 20 cm can be selected and cut into tubes each having a length of 10 to 30 cm serving as the frame for a monomer MFC. The tubes formed by cutting are drilled to form holes 8 at a distribution density of 100 to 3000 holes per square meters of frame outer surface and each with a diameter between 0.5 and 2 cm.

The carbon cloth 6 carrying catalysts are prepared as follows. $MnO_2$, carbon black conducting materials and PVDF adhesive are well mixed at weight ration of 65:20:15, then to the mixture is added N-methyl-pyrrolidone solvent and stirred to form a paste. The paste is then subject to ultrasonic dispersion and evenly applied to a dry carbon cloth which is then vacuum dried to form the carbon cloth 6 used in this example. The membrane 7 is preferably a cation exchange membrane. The membrane cathode 3 is formed by hot press of the carbon cloth 6 carrying catalysts with the membrane 7 at 115° C. for 5 minutes.

The anode 4 is preferably a carbon felt.

The closed end of the cell is inserted into the sediment of a river, a pool pond or a canal, see FIG. 5 for a simulation device. The anode chamber is formed when the anode is in contact with the sediment. Anaerobic microorganisms are accumulated, reproduced, and cultivated at the anode chamber. The top end of the frame 2 is located above the water to make sure the cathode chamber is filled with air and has no water. The PVC tube with drilled holes 8 is wrapped by the membrane cathode 3. Epoxy resins may be used to seal the contact portions between the opposite edges of the membrane cathode and the PVC tube. The carbon cloth 6 carrying catalysts is facing towards the PVC tube and exposed to the air through the holes 8, and the membrane 7 is facing outside. Wires are extended from the anode and the cathode respectively to form a closed circuit. The organic wastes in the sediment are catalytically oxidized by the anaerobic electricgens to generate electrons and protons. The protons and electrons are delivered through the membrane and the external circuit respectively to the cathode to react with oxygen, so as to generate electric current.

Example 2

Two or more of the microbial fuel cell, each substantively the same as that in Example 1 but with both ends of the frame open, are vertically (or perpendicularly) disposed on a same connection tube that has two closed ends, to form a cell stack. This cell stack is suitable for use in a long narrow water body. The connection tube may also be made from insulated materials.

Example 3

Figure 8:
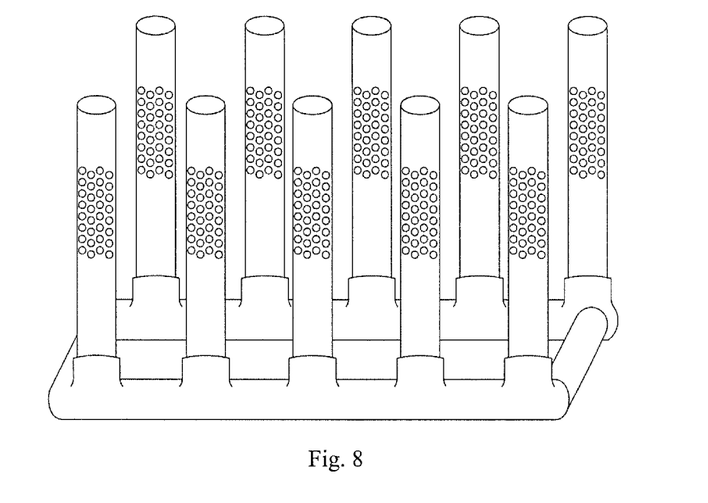
FIG. 8 is an exemplary cell stack frame of a tubular microbial fuel cell stack.
Figure 9:
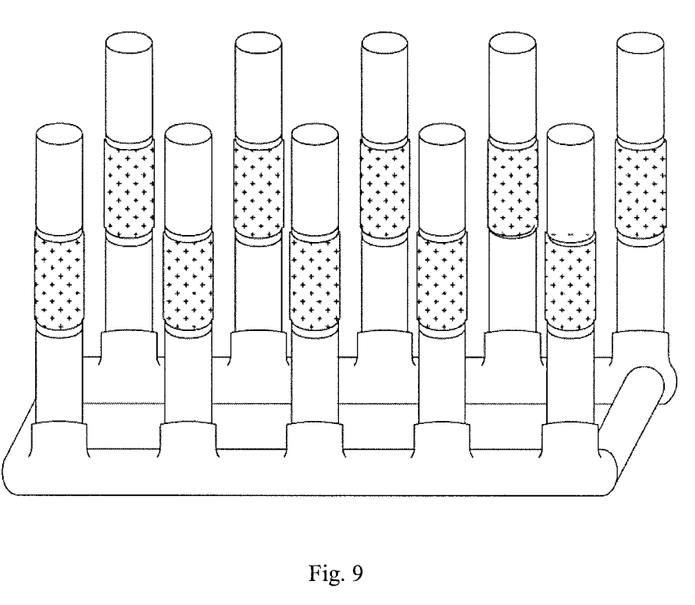
FIG. 9 is an exemplary tubular microbial fuel cell stack in assembled state.

An alternative microbial fuel cell stack is provided by this example, as shown in FIGS. 8 and 9, where FIG. 8 shows an exemplary cell stack frame of a tubular microbial fuel cell stack and FIG. 9 shows an exemplary tubular microbial fuel cell stack in assembled state.

The microbial fuel cell stack is formed by a plurality of monomer cells and connecting tubes with each of the cathode chambers communication with each other. The monomer cell is the same as that in Example 1, as shown in FIGS. 2 to 5.

The plurality of the microbial fuel cells (MFCs) is vertically disposed on a plurality of cross connected connecting tubes. The plurality of the connecting tubes is interconnected to form a closed loop. Each of the cells is vertically placed in the sediment to be treated with the top end of the cell located above the water to ensure the cathode chamber is filled with air. The air is able to communicate between each of the cathode chambers of the cells, so that an efficient cell stack is formed.

The microbial fuel cell stack can be inserted into the sediment of a river, a pool pond or a canal. The anode chamber is formed when the anode is in contact with the sediment. Anaerobic microorganisms are accumulated, reproduced, and cultivated at the anode chamber. The top end of the frame of each monomer cell is located above the water to make sure the cathode chamber is filled with air. The PVC tube with drilled holes is wrapped by the membrane cathode with the membrane facing outside and the carbon cloth facing inside, i.e., the carbon cloth is in contact with the PVC tube. The membrane cathode is contacted with air through the holes. Wires are extended from each of the cathodes and anodes and can be connected so that the plurality of the monomer cells is connected in series or in parallel. The organic wastes in the sediment are catalytically oxidized by the anaerobic electricgens to generate electrons and protons. The protons and electrons are delivered through the membrane and the external circuit respectively to the cathode to react with oxygen, so as to generate electric current.

Example 4

River Sediment Treatment and Electricity Generation Using MFC

1. Construction and Assembly of a Tubular Monomer MFC (1) Preparation of a perforated frame: a polyvinyl chloride (PVC) tube (20 cm in length×5 cm in diameter) is selected to use as the MFC frame. The frame is drilled to form holes having a diameter of 1 cm and a density of 2000 holes per square meters on the outer surface area of the frame.

(2) Preparation of a membrane cathode: manganese dioxide, graphite powder, and PVDF are well mixed at a weight ratio of 65:20:15. To the mixture is added N-methyl-pyrrolidone solvent and stirred to form a paste. The paste is then evenly applied to a carbon cloth (15 cm in length×12 cm in width) which is then dried at 100° C. to obtain a cathode carrying catalysts (with $MnO_2$ loading at 5.0 mg/cm$^2$); the cathode carrying $MnO_2$ catalysts is hot pressed with a cation exchange membrane (the side carrying the catalysts contacts with the membrane) at 115° C., 14 MPa for 5 minutes. The membrane cathode is obtained when cooled to room temperature. The membrane cathode can also be made by other methods known in the art.

(3) The membrane cathode obtained is used to wrap the perforated PVC frame with the membrane facing outside and the carbon cloth facing toward the PVC frame and in contact with the air. The contact portions between the edges of the membrane cathode and the PVC frame is sealed for example by epoxy resin. A titanium wire is connected to the conducting layer to use as a cathode wire.

(4) A carbon felt (16 cm in length×12 cm in width×0.5 cm in thickness) is rolled to wrap the membrane cathode. Another titanium wire is connected to the carbon felt to serve as an anode wire. A monomer tubal MFC is thus formed. FIG. 4 shows the sectional view of the monomer MFC.

2. The cell is inserted into the sediment of a river. The anode chamber is formed when the anode is in contact with the sediment. Anaerobic microorganisms are accumulated, reproduced, and cultivated at the anode chamber. The top end of the frame is located above the water to make sure the cathode chamber is filled with air. The organic wastes in the sediment are catalytically oxidized by the anaerobic electricgens to generate electrons and protons. The protons and electrons are delivered through the membrane and the external circuit respectively to the cathode to react with oxygen, so as to generate electric current. A 30Ω external resistance is connected between the anode and cathode of the MFC. The cell is placed in the sediment for a half year for sediment electricity generation experiment.

Figure 6:
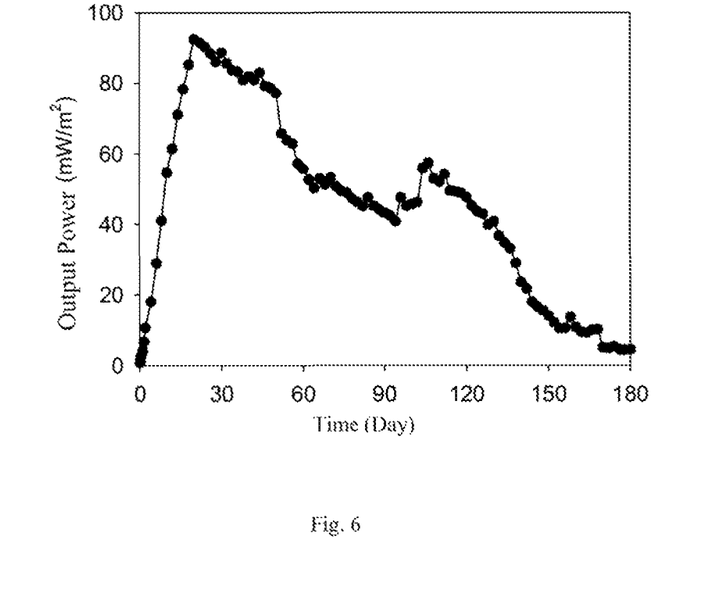
FIG. 6 is a diagram showing the output power as function of time during the treatment of sediment using a tubular monomer microbial fuel cell.
Figure 7:
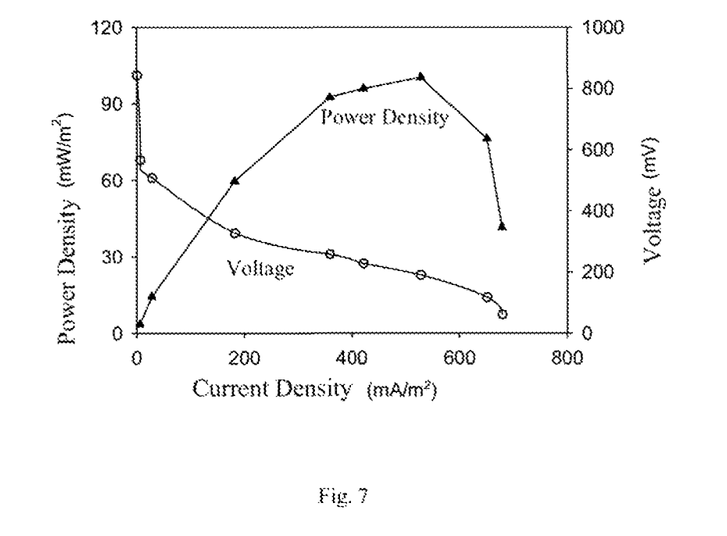
FIG. 7 is a diagram showing the power generation performance of a tubular monomer microbial fuel cell.

The output power of the cell, and the oxidation-reduction potential, COD and acid volatile sulfides (AVS) of the sediment before and after the experiment, are determined using standard methods. The results, as shown in FIGS. 6, 7 and table 1, indicate that, the black and odorous sediment turns to be yellowish-brown in color and without bad smell after 6-month in-situ treatment due to the oxidation of the organics in the sediment. It can be seen from table 1 that, the removal rate of COD and AVS of the sediment is 36.2% and 94.4% respectively. The oxidation-reduction potential of the sediment is increased from initial value of −169.5 mV to +237.2 mV.

TABLE 1 properties changes of the sediment before and after MFC in-situ electricity generation

|  | Redox Potential (mV) | COD (mg/L) | AVS (mg/g) |
|---|---|---|---|
| Untreated Sediment | −169.5 | 31850 | 6.61 |
| MFC treated Sediment (30 Ω external resistance) | +237.2 | 20320 | 0.37 |

It can be seen from FIGS. 6 and 7 that, the output power of the sediment MFC is increasing at a first stage and starts to decrease at a second stage. The increase in output power at the first stage is due to the cultivation of the electricigens, and the decrease at the second stage is a result of the reduced activity of the oxygen reduction catalysts at the cathode. The maximum output power of the sediment MFC is about 100.4 mW/m$^2$ (the power density was normalized on the surface area of the cathode) and the open circuit voltage is 0.84 V.

Example 5

Pool Pond Sediment Treatment and Electricity Generation Using MFC Stack

An MFC stack is constructed and assembled according to the procedures described in Example 4 except that the perforated frame is increased from 1 to 10 in number, and the oxygen reduction catalysts of the cathode is changed from manganese dioxide (MnO$_2$) to cobalt tetramethoxy-phenylporphyrin (CoTMPP). Each of the monomer cells are connected by hollow connecting tubes having a same diameter and the cathode chamber of each monomer cell is communicated with each other, so that a tubal MFC stack is formed, as shown in FIGS. 8 and 9.

The cell stack is inserted into the sediment of the pool pond to form the anode chamber. Anaerobic electricigens are accumulated, reproduced, and cultivated at the anode chamber. The top end of the frame is located above the water to make sure the cathode chamber is filled with air and is not submerged by water. The monomer cells are connected in parallel and a 5Ω external resistance is connected. The cell stack is placed in the sediment for a half year for the experiment of sediment treatment and electricity generation.

The output power of the cell stack, and the oxidation-reduction potential, COD and acid volatile sulfides (AVS) of the sediment before and after the experiment, are determined using standard methods. The results indicate that, the black and odorous sediment turns to be yellowish-brown in color and without bad smell after 6-month in-situ treatment due to the oxidation of the organics in the sediment. The COD of the sediment is decreased from initially 23680 mg/L to 14560 mg/L with a removal rate of 38.5%. The AVS of the sediment is decreased from initially 5.35 mg/g to 0.46 mg/L with a removal rate of 91.4%. The oxidation-reduction potential of the sediment is increased from initially −151.2 mV to +245.5 mV. The data collected over the 6 months shows that the maximum output power density of the sediment MFC is about 56.2 mW/m$^2$ (the power density was normalized on the surface area of the cathode) and the open circuit voltage is 0.76 V.

What is claimed is:

1. A device for in-situ treatment of sediment simultaneous with microbial electricity generation, wherein the device is used as a microbial fuel cell placed in the sediment of a water body, the microbial fuel cell using organics in the sediment as fuels, the device comprises:
    a first insulated tube having at least one perforated section disposed between a closed end and an open end of the insulated tube, the open end allowing for air to flow therethrough, the at least one perforated section including more than two holes extending through the insulated tube;
    a membrane cathode being wrapped about the at least one perforated section to form a cathode chamber within the insulated tube, the membrane cathode being in contact with air located within the insulated tube via the more than two holes;
    an anode being wrapped about the membrane cathode such that an inner surface of the anode is adjacent to the membrane cathode and an outer surface of the anode is configured for contact within the sediment; and
    a second insulated tube having an open end and a cathode chamber formed therein and being interconnected to the first insulated tube via a connecting tube such that the cathode chamber of the first insulated tube is in fluid communication with the cathode chamber of the second insulated tube and such that the open ends of each of the first and second insulated tubes open in a direction away from the connecting tube.

2. The device of claim 1, wherein the insulated tube is made from PVC and the at least one perforated section has about 100 to 3000 holes per square meter.

3. The device of claim 1, wherein:
    an inner surface of the membrane cathode is made from carbon cloth,
    an outer surface of the membrane cathode is made from a cation membrane, and
    a catalyst applied to the carbon cloth contacts the cation membrane, the catalyst being one of manganese dioxide or cobalt tetramethoxy-phenylporphyrin (CoTMPP).

4. The device of claim 1, wherein the connecting tube has closed ends and the first and second insulated tubes are interconnected to the connecting tube at locations disposed along a length of the connecting tube.

5. The device of claim 1, wherein the connecting tube is one of a plurality of connecting tubes interconnected to form a closed loop.

6. A device for in-situ treatment of sediment simultaneous with microbial electricity generation, wherein the device is used as a microbial fuel cell placed in the sediment of a water body, the microbial fuel cell using organics in the sediment as fuels, the device comprises:
    a connecting tube having a length; and
    a plurality of fuel cells joined to and extending from the connecting tube at locations along the length of the connecting tube, each of the plurality of fuel cells having an insulated tube, a membrane cathode, and an anode, the insulated tube having an open end allowing for air to flow therethrough and a perforated section defined by a plurality of perforations extending through insulated tube, the membrane cathode being wrapped about the perforated section such that air disposed within the insulated tube contacts the membrane cathode through the plurality of perforations, the anode being wrapped about the membrane cathode such that the membrane cathode is disposed between the anode and insulated tube and such that the anode is exposed to the sediment.

7. The device of claim 6, wherein an epoxy resin seals the membrane cathode to the insulated tube.

8. The device of claim 6, wherein the membrane cathode and insulated tube define a cathode chamber, the cathode chambers of each of the plurality of fuel cells being interconnected by the connecting tube.

9. The device of claim 6, wherein the membrane cathode includes a carbon cloth side and a cation membrane side, the carbon cloth side facing the insulated tube, the cation membrane side facing the anode.

10. The device of claim 9, wherein the membrane cathode includes a catalyst comprised of one of manganese dioxide or CoTMPP.

11. The device of claim 6, wherein the perforations are holes having a diameter of about 0.5 to 2 cm.

12. The device of claim 11, wherein the perforated section has about 100 to 3000 holes per square meter.

13. A device for in-situ treatment of sediment simultaneous with microbial electricity generation, wherein the device is used as a microbial fuel cell placed in the sediment of a water body, the microbial fuel cell using organics in the sediment as fuels, the device comprises:
 a plurality of connecting tubes coupled together to form a closed loop; and
 a plurality of fuel cells joined to and extending from the closed loop, each of the plurality of fuel cells having an insulated tube, a membrane cathode, and an anode, the insulated tube having an open end allowing for air to flow therethrough and a perforated section defined by a plurality of perforations extending through the insulated tube, the membrane cathode being wrapped about the perforated section such that air disposed within the insulated tube contacts the membrane cathode through the plurality of perforations, the anode being wrapped about the membrane cathode such that the membrane cathode is disposed between the anode and insulated tube and such that the anode is exposed to the sediment.

14. The device of claim 13, wherein the perforations are holes having a diameter of about 0.5 to 2 cm.

15. The device of claim 13, wherein an epoxy resin seals the membrane cathode to the insulated tube.

16. The device of claim 13, wherein the membrane cathode and insulated tube define a cathode chamber, the cathode chambers of each of the plurality of fuel cells being interconnected by the closed loop.

17. The device of claim 13, wherein the membrane cathode includes a carbon cloth side and a cation membrane side, the carbon cloth side facing the insulated tube, the cation membrane side facing the anode.

18. The device of claim 17, wherein the membrane cathode includes a catalyst comprised of one of manganese dioxide or CoTMPP.

* * * * *